March 27, 1934.    W. G. WILSON    1,952,483
MECHANICAL LOCK
Filed Dec. 20, 1930
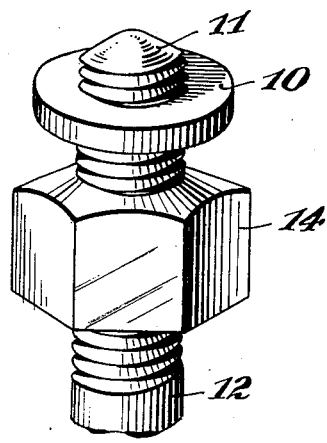
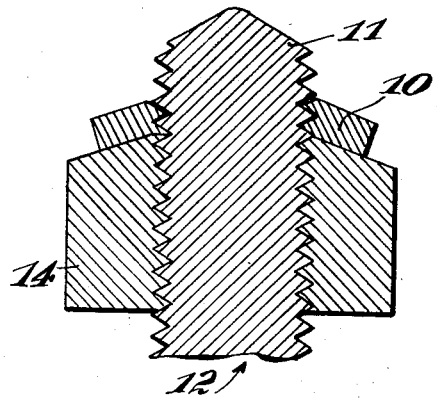
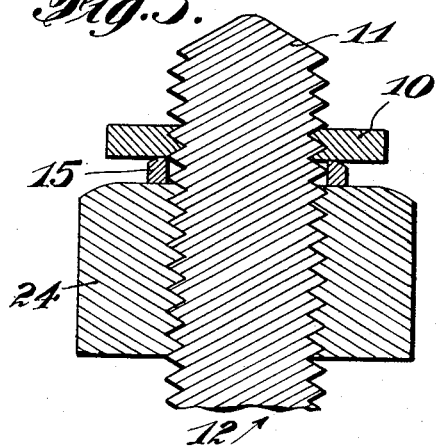
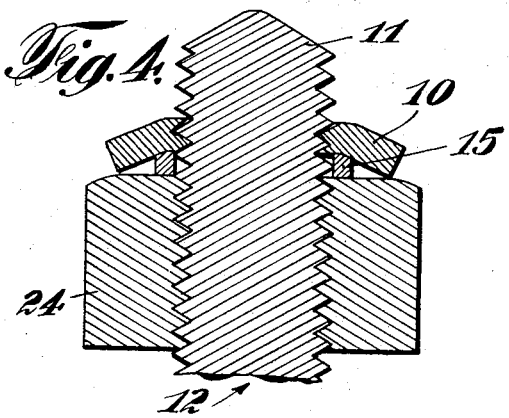
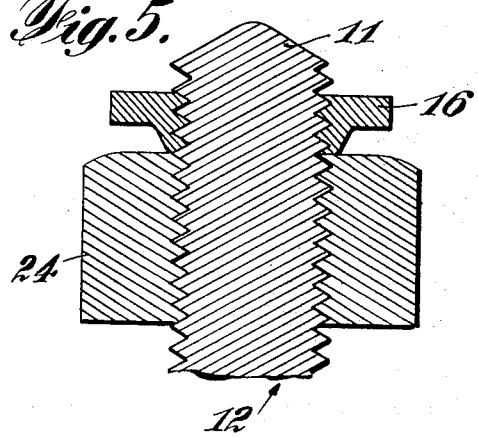
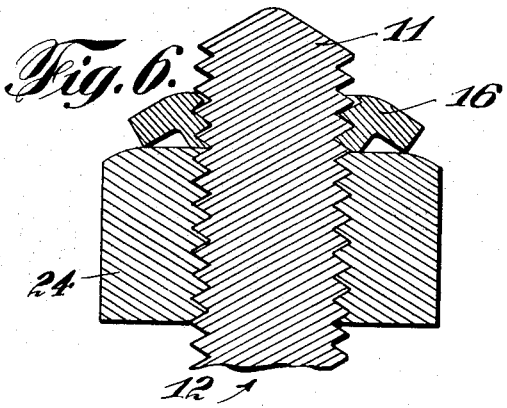
INVENTOR
Wylie G. Wilson
BY
his ATTORNEYS Patented Mar. 27, 1934

1,952,483

UNITED STATES PATENT OFFICE 1,952,483

MECHANICAL LOCK

Wylie G. Wilson, Elizabeth, N. J.

Application December 20, 1930, Serial No. 503,728
In Canada November 12, 1930

4 Claims. (Cl. 151—30)

This invention relates to locking devices and more particularly to locking devices of the class commonly known as "nut locks".

Heretofore, various types of structures have been used as "nut locks" for locking nuts on bolts, but such devices have possessed inherent disadvantages such as the mutilation of the bolt threads, the requirement of extra members, etc.

An object of the present invention is to provide an improved locking device for locking nuts on bolts, which device is of great simplicity, can be manufactured at low cost and is generally of great efficiency, being quickly and easily applied.

According to the invention disclosed in this application, which is a continuation in part of my co-pending application Serial No. 326,795, filed December 18, 1928, for Mechanical locks and locking methods, use is made of a washer-like member having a flat top and provided with a substantially central aperture, which aperture is threaded for engagement with the threads of a bolt. The locking device of the invention is applied to a bolt by screw-threading the same thereupon in such a manner that a part thereof contacts either with a nut on the same bolt or with an auxiliary member positioned immediately adjacent the bolt and then the locking member is locked firmly on the bolt by distorting the member in such a manner that a part thereof so firmly grips the bolt that the member cannot be removed therefrom without destroying the usefulness thereof. The removal is accomplished by rupturing the formation of the member with a cold chisel or other suitable tool.

Specifically, the invention consists in one instance of a flat washer-like member having its faces or surfaces lying in substantial parallel planes and being provided with a substantial central aperture which is screw-threaded. This type of device is used in connection with a threaded bolt and in conjunction with a nut on the bolt, the nut having one surface substantially conoidal in form. In the use of this form of the invention the nut is tightened on the bolt to the desired degree, after which the locking member is screwed down upon the bolt until one edge of the aperture thereof engages the top of the nut. The locking member is then distorted to cause it to assume substantially the same shape as the top of the nut (a conoidal shape) by means of a suitable tool, due to which distortion the member grips the bolt so firmly that it cannot be removed therefrom without destroying the same so far as further use is concerned. Since the locking member is screw-threaded, the clinching of the same upon the bolt by distortion results in no damage to the threads of the bolt, in such manner preserving the usefulness of the bolt indefinitely.

In another form of the invention a flat washer-like member similar in shape and construction to that previously described is used in connection with a nut of conventional form, that is a nut not provided with a conoidal surface. In order that the locking member may be distorted into substantially conoidal form, a sleeve of suitable length is positioned between one surface of the nut and an adjacent surface of the locking member. This sleeve has the end thereof contacting with the locking member chamfered, so that the locking member may be distorted without having its under surface broken by a sharp corner of the sleeve. It will be seen, therefore, that the sleeve serves as a fulcrum to assist in distorting the locking member into substantially conoidal form. When the member is distorted the wall of the aperture thereof becomes firmly clinched against the bolt to some degree, so that, as before, the locking member cannot be removed without destroying the member so far as further use is concerned.

In a still further form of the invention, the locking member is of such construction as to provide one surface lying in a single plane, while the wall surrounding the aperture of the member is extended to provide in effect a sleeve integral with the body of the member. This sleeve is used in lieu of the separate sleeve described in the immediately preceding form of the invention, acting as a fulcrum when the member is distorted into substantially conoidal form.

Other features, objects and advantages of the invention will become apparent by consideration of the following detail description, taken in conjunction with the accompanying drawing, wherein:

Figure 1 is a perspective view of a structure embodying the invention in one form, the locking member being applied to a bolt having a nut thereon, but not being engaged therewith;

Figure 2 is a sectional view showing the locking member of Figure 1 in locked position upon a bolt having a nut thereon of peculiar form;

Figure 3 is a longitudinal section of an assembly, wherein a locking member similar to that shown in Figure 1 is made use of in conjunction with a fulcrum forming sleeve positioned between a nut on the bolt and the locking member;

Figure 4 is a corresponding sectional view showing the assembly of Figure 3 in locked position;

Figure 5 is a longitudinal section showing an assembly of a bolt, nut and locking member having a fulcrum forming sleeve constructed as an integral thereof, and Figure 6 is a similar view of the same assembly in locked position.

Referring now to the drawing and particularly Figures 1 and 2, 10 indicates a simple form of a locking device embodying the present invention and shown in original or undistorted state. The device consists of a flat disc of substantial thickness provided with a central opening, which opening is screw-threaded so that the device may be engaged with the threaded end 11 of a bolt 12. The member 10 may be made of any suitable material, although metal of the proper characteristics is preferred. If the member be formed of steel, it may be used in place of an ordinary nut in installations wherein only moderate strength is necessary.

In conjunction with the member 10, use is made of a nut 14 having an upper conical face, the curvature of which depends upon several factors, such as the size and pitch of the bolt thread, etc.

In the use of this arrangement shown in Figures 1 and 2, a nut such as illustrated at 14 is introduced on to the end 11 of bolt 12 and tightened to contact with the object held in place (not shown) as much as possible. A locking device of the character illustrated at 10 is then introduced on the threaded end 11 of the bolt and screwed downwardly until it contacts firmly with the upper edge of the nut 14. When so positioned the locking member may be set or distorted into clinching engagement with the bolt by means of the application of force through the agency of a "set" or die. This tool in its simplest form is provided with a substantially tubular end, the opening of which slips over the end of the bolt, while the flat annular end face thereof engages the member 10. By the application of repeated blows to the tool, the member 10 may be distorted into substantially the form shown in Figure 2, assuming a form corresponding somewhat to that of a truncated conoid. By so distorting the member 10, the lower part of the aperture wall is constricted in such a manner as to unyieldingly grip the threads 11 of the bolt. The best results are obtained when the angle through which the member 10 is distorted is sufficiently large to insure positive engagement of the aperture wall with the threads of the bolt, without appreciably weakening the structure of the member. Since the final form of the locking member is determined by the curvature of nut 14, it is essential that this curvature be proportioned to the pitch of the bolt thread, as pointed out before, the angle of bend or distortion preferably increasing in proportion to the pitch of the bolt thread.

Due to the locking of the lower part of the aperture wall with the bolt threads, a great gripping force is exerted, which prevents the member from being removed from the bolt without the application of destructive force. The only manner in which the locking member can be efficiently removed consists of splitting the same with a suitable tool such as a cold chisel to thereby release the force of restriction so that nut 14 can be disengaged from the bolt by means of the usual wrench. By destroying the locking member, so far as further use is concerned, to remove the same, the threads of the bolt remain intact and undamaged, a condition not prevalent with conventional types of locking devices.

In the form of the invention shown in Figures 3 and 4, the specially shaped nut 14 is dispensed with, use being made of a nut 24 of conventional type. Since this nut 24 is not provided with a curved surface, it is necessary to substitute some member which will form a fulcrum about which the locking member 10, similar to that shown in Figures 1 and 2, can be distorted. To this end, use is made of a short sleeve 15 which is positioned on the threaded end of the bolt between nut 24 and locking member 10. As clearly shown in the drawing, the upper and outer edge of the sleeve 15 is chamfered to more evenly distribute the shearing stresses during bending of the locking member and to also confine the line of bending as closely as possible to the threads of the bolt.

As before stated, the fulcrum sleeve 15 acts in the nature of a pivot during distortion of member 10, and the maximum of effectiveness is secured when the sleeve is so constructed as to be of small cross-section cross-axially. The height of the fulcrum sleeve, which must be precisely determined, is dependent largely upon the pitch of the screw thread of the bolt, being high enough to permit sufficient angular distortion of the locking member 10, to insure contraction of the aperture wall into permanent engagement with the bolt threads. Excessive height of the sleeve results in unduly large distortion of member 10 and consequent weakening thereof.

The assembly of the parts is evident from Figure 3 and, with parts in the position shown, they are locked by the application of force by means of a tool of the character before described, with the result that the locking member assumes the shape shown in Figure 4. To remove the locking member it is again necessary to apply destructive force by means of a tool such as a cold chisel.

In the form shown in Figures 5 and 6, use is made of the advantages inherent in the structures shown in Figures 1 to 4 inclusive, in conjunction with a nut of conventional type. To overcome the necessity of providing a separate fulcrum sleeve, the locking member 10 is provided with an annular extension 16 which serves to effectively prolong the wall of the aperture of the member. When this modified locking member has been tightened against the top of a nut 24, it is clinched in position by applying distortive force as explained in the other embodiments, resulting in constriction of the aperture wall and, since this wall has been prolonged, the constriction takes place over a larger expanse of wall with the resultant increased binding of aperture wall to bolt thread. To remove the locking member it is necessary to make use of some tool such as a cold chisel, as before explained.

In practice of the invention, regardless of the form, it is essential that the locking member be firmly seated against whatever member it contacts with, whether that be the nut itself or an interposed member. The presence of any foreign obstruction, which prevents firm seating of the locking member, causes the possibility of failure of proper clinching. For example, should aperture wall terminate in a bur, due to punching, drilling or tapping, the presence of this bur between or against the member against which the locking device is to be seated, will reduce the effectiveness of the clinching, since the bur will be broken down during constriction of the aperture wall. For this reason, if such bur is present in the structure, care should be taken to prevent the locking member being introduced on to the bolt with this bur coming into contact with other members on the bolt. On the other hand, the bur may very readily be on the outmost edge of the locking member without reducing the effectiveness thereof, as will be readily apparent.

From the foregoing, it will be seen that the locking devices as set forth in this application produce arrangements which are simple, efficient and inexpensive to manufacture. To this end it is to be understood that the invention is not to be limited by the illustrated embodiments but is to be limited only by the scope of the following claims.

I claim:

1. A clamping member comprising a deformable completely flat-topped washer-like body with an aperture, the wall of the aperture being cut with screw threads for cooperation with the screw threads of a bolt, said member being adapted to be clamped on the bolt by deforming part of the body in a direction parallel to the axis of the bolt into shape wherein the top of the member assumes the form substantially of a truncated conoid, thereby constricting the aperture and causing the member to grip the bolt.

2. A clamping member comprising a deformable completely flat-topped washer-like body with an aperture, the wall of the aperture being cut with screw threads for cooperation with the screw threads of a bolt, said member being adapted to be clamped on the bolt by deforming part of the body in a direction parallel to the axis of the bolt into shape wherein the outer edges of the member lie in planes beyond their original planes, thereby constricting the aperture and causing the member to grip the bolt.

3. A clamping member comprising a deformable completely flat-topped washer-like body with an aperture, the wall of the aperture being cut with screw threads for cooperation with the screw threads of a bolt, said member being adapted to be clamped on the bolt by deforming part of the body in a direction parallel to the axis of the bolt about a fulcrum surrounding the bolt, thereby constricting the aperture and causing the member to grip the bolt.

4. A clamping member comprising a deformable completely flat-topped washer-like body having an aperture, the wall of which is cut with screw threads for cooperation with the screw threads of a bolt, said body being provided with an annular extension forming a prolongation of said aperture wall, said member being adapted to be clamped on the bolt by deforming part of the body in a direction parallel to the axis of the bolt and about said extension as a fulcrum, thereby causing the top of the member to assume the shape substantially of a truncated conoid, constricting the aperture and causing the member to grip the bolt.

WYLIE G. WILSON.